(12) United States Patent
Amit et al.

(10) Patent No.: US 9,020,371 B2
(45) Date of Patent: Apr. 28, 2015

(54) PRINTING

(75) Inventors: Gal Amit, Bat Yarn (IL); Ran Waidman, Rehovot (IL); Shlomo Harush, Nes-Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/001,859

(22) PCT Filed: Feb. 28, 2011

(86) PCT No.: PCT/US2011/026529
§ 371 (c)(1),
(2), (4) Date: Aug. 27, 2013

(87) PCT Pub. No.: WO2012/118480
PCT Pub. Date: Sep. 7, 2012

(65) Prior Publication Data
US 2013/0330092 A1    Dec. 12, 2013

(51) Int. Cl.
*G03G 15/01* (2006.01)
*H04N 1/60* (2006.01)

(52) U.S. Cl.
CPC ............. *G03G 15/01* (2013.01); *H04N 1/6036* (2013.01)

(58) Field of Classification Search
CPC combination set(s) only.
See application file for complete search history.

(56) References Cited

U.S. PATENT DOCUMENTS

| | | | |
|---|---|---|---|
| 5,864,353 A * | 1/1999 | Gila et al. | 347/131 |
| 6,147,698 A | 11/2000 | Zable | |
| 2005/0093923 A1* | 5/2005 | Busch et al. | 347/43 |

FOREIGN PATENT DOCUMENTS

| | | |
|---|---|---|
| JP | 2006-239995 A | 9/2006 |
| KR | 10-0390673 B1 | 6/2003 |

OTHER PUBLICATIONS

International Search Report and Written Opinion mailed Aug. 18, 2011, issued in international application No. PCT/US2011/026529.

* cited by examiner

*Primary Examiner* — Clayton E LaBalle
*Assistant Examiner* — Jas Sanghera

(57) ABSTRACT

An embodiment of this disclosure involves printing color outputs on sheets, reading the color outputs and adjusting a calibration parameter.

15 Claims, 6 Drawing Sheets

PRINTING

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

In print systems, certain operational parameters may change state during the lifetime and usage of the print system. Operational parameters such as temperatures, sheet material properties, electrical resistances, ink properties, toner properties such as conductivities and densities, binary ink developer properties, and/or other states may unintentionally change during the usage of the print system. These changes can affect the print system's color output. To maintain a better control of the color output, most print systems are regularly calibrated.

BRIEF DESCRIPTION OF THE DRAWINGS

For the purpose of illustration, certain embodiments of the present invention will now be described with reference to the accompanying diagrammatic drawings, in which.

DETAILED DESCRIPTION

In the following detailed description, reference is made to the accompanying drawings. The embodiments in the description and drawings should be considered illustrative and are not to be considered as limiting to the specific embodiment of element described. Multiple embodiments may be derived from the following description and/or drawings through modification, combination or variation of certain elements. Furthermore, it may be understood that also embodiments or elements that are not literally disclosed may be derived from the description and drawings by a person skilled in the art.

Figure 1:
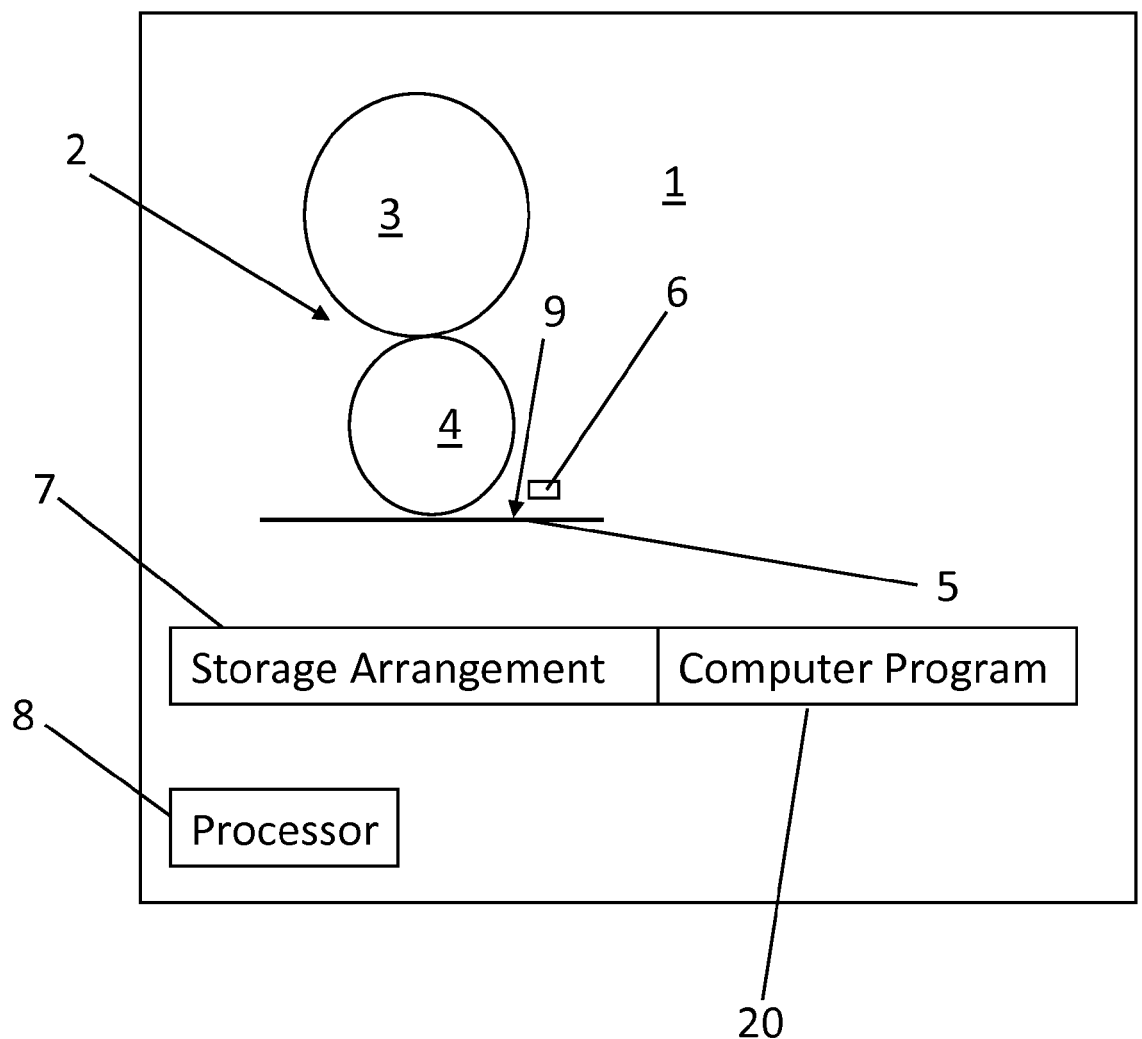
FIG. 1 illustrates a diagram of an embodiment of a print system.

FIG. 1 shows a print system 1 for printing sheets 5. The print system 1 may be any type of printer or press, for example any type of offset printer or press. In an embodiment, the print system 1 comprises a digital press, for example a liquid or dry electrophotographic digital press. The sheets 5 for printing may comprise any print medium such as paper.

The print system 1 comprises an image transfer arrangement 2. In an embodiment, the image transfer arrangement 2 comprises a developer drum 3 and an image transfer drum 4 for imprinting liquid toner onto the sheets 5. In other embodiments, the image transfer arrangement 2 comprises dry toner drums, offset printing drums and/or a print head.

The print system 1 comprises an image sensor 6, arranged to measure color outputs 9 printed on the sheets 5. The print system 1 further comprises a storage arrangement 7 and a processor 8. The storage arrangement 7 comprises a computer program 20, configured to instruct the processor 8. The computer program 20 may comprise installed software and/or firmware.

In an embodiment, the processor 8 comprises, or is part of, a print system controller. In another embodiment, the processor 8 is part of a component or subcomponent of the print system 1, for example the image sensor 6. The processor 8 processes signals from the image sensor 6. The processor 8 is configured to signal the image transfer arrangement 2.

In an embodiment, the storage arrangement 7 comprises a non-volatile memory. The storage arrangement 7 stores color values configured to convert digital inputs to color outputs. In an embodiment, the color values comprise one or more LUTs configured to convert digital inputs to color outputs. For example, the storage arrangement 7 stores at least one machine LUT and/or at least one dynamic LUT. The storage arrangement 7 stores a calibration algorithm, and certain thresholds pertaining to parameters of the calibration algorithm.

Figure 2:
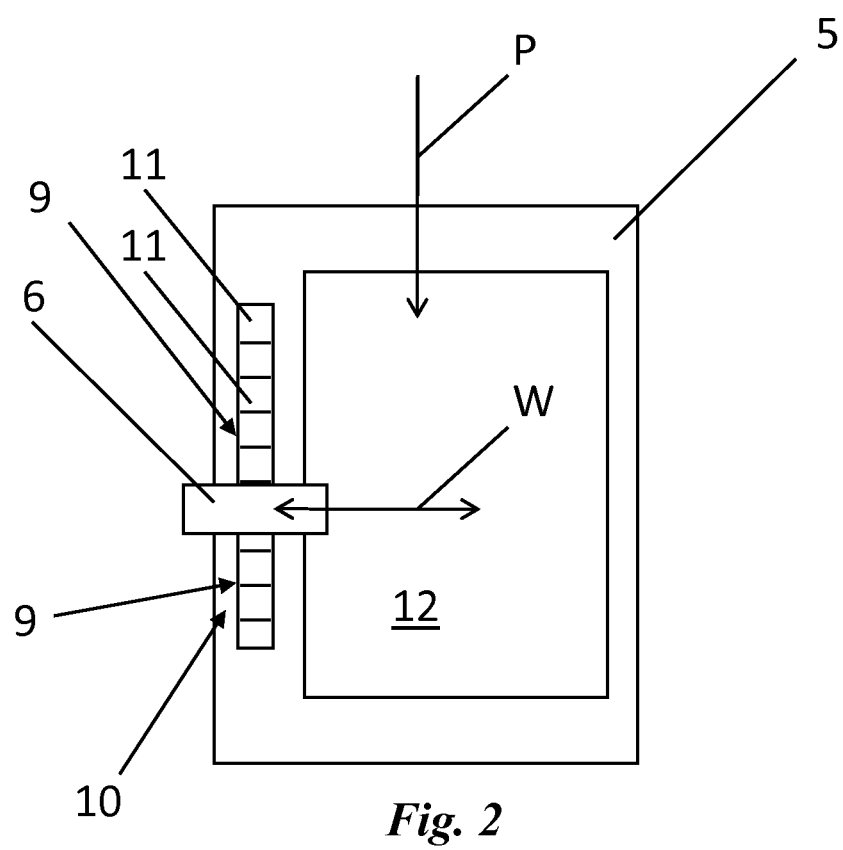
FIG. 2 illustrates a diagram of an embodiment of a printed sheet including color outputs, and an image sensor for measuring the color calibration patches, in top view.

FIG. 2 shows a diagrammatic example of a printed sheet 5, including color outputs 9, and an image sensor 6, in top view. The printed sheet 5 comprises color outputs 9. The color outputs 9 are configured to be used for color calibration. In the shown embodiment, the color outputs 9 comprise a color calibration strip 10 comprising color calibration patches 11. The color calibration patches 11 are printed near an edge of the sheet 5. The color calibration patches 11 may comprise a number of patches of solid colors and a number of patches of gray colors. In an embodiment, a solid color calibration patch 11 consists of a sheet region with ink or toner of 100% dot area and a gray color calibration patch 11 consists of a sheet region with ink or toner of less than 100% dot area. The color calibration patches 11 may be printed outside of a print area 12 of the sheet 5, but on the same sheet 5 as the print area 12. Herein, the print area 12 is defined as the printed area of the sheet 5 that is used for the commercial end result, such as a book, folder, advertisement, letter, photo album, labels etc, and that contains the printed image. By printing the color calibration patches 11 outside of the print area 12, the strip 10 can be removed after printing, for example using an inline or off line cutting device. The color calibration patches 11 may be printed near a side of a respective sheet 5, for example near a top, bottom or side edge.

In an embodiment, the image sensor 6 comprises a densitometer or a spectrophotometer. In an embodiment, the image sensor 6 is an inline image sensor 6. The inline image sensor 6 is embedded in the print system 1, and arranged to measure the color calibration patches 11 during printing. During printing, the sheets 5 pass along the image sensor 6, in a direction P. In the shown embodiment, the image sensor 6 is arranged to read the sides of the sheets 5, which contain the color calibration patch strips 10. In the shown embodiment, the image sensor 6 is arranged to move to a side of the respective sheet 5. The image sensor 6 may be arranged to move along the width of the sheet 5, in a direction W.

An embodiment of this disclosure may be realized without printing color calibration patches 11 outside of the print area 12, but instead printing and reading patches 11 inside the print area 12. In addition to, or instead of a densitometer and/or spectrometer, the image sensor 6 may comprise a camera, a scanner, a CCD or CMOS chip, or any other suitable optical sensor.

Figure 3:
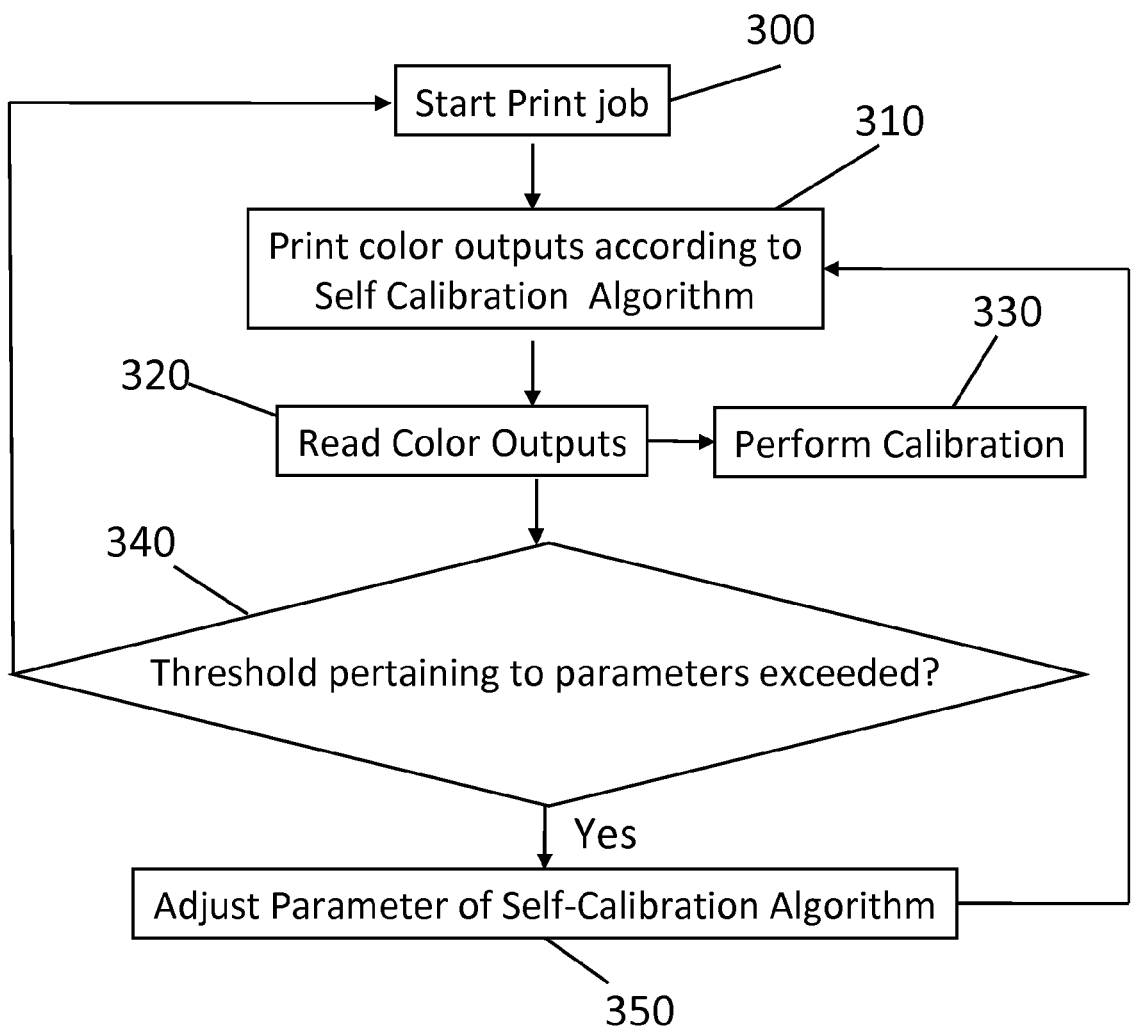
FIG. 3 shows a flow chart of an embodiment of a method of self-adjusting calibration parameters of a print system during color calibration.

FIG. 3 shows a flow chart of an embodiment of a method of self-adjusting calibration parameters of a print system 1. In a first block 300 the print job is started. First sheets 5 are printed. First color outputs 9 are printed on the sheets 5. As indicated in a second block 310, the color outputs 9 are printed and measured according to a calibration algorithm. The parameters of the calibration algorithm set the conditions of the color calibration of the print system 1. For example, the parameters comprise a print frequency of the patches 11 and/or an optical density tolerance range for the color outputs 9 and/or other properties of the color calibration patches 11.

The color outputs 9 are read with the image sensor 6, as indicated by a third block 320. For example, the color output readings are used for color calibration, for example to calibrate a LUT or to calibrate certain operational print system parameters, as indicated by block 330. Furthermore, the calibration algorithm may self adjust its parameters when a threshold pertaining to the respective calibration parameter is exceeded, as indicated by blocks 340 and 350. In block 340, it is verified if a predetermined threshold pertaining to one of the parameters is exceeded. In block 350, the respective parameter is adjusted. For example, if a particular color output 9 has been calibrated more than a predetermined number of times, this may imply that the respective color is relatively unstable and its printing frequency may be increased.

The method of FIG. 3 allows for self-adjustment of the parameters of the calibration algorithm. In this way, the color calibration may be optimized without operator intervention.

Figure 4:
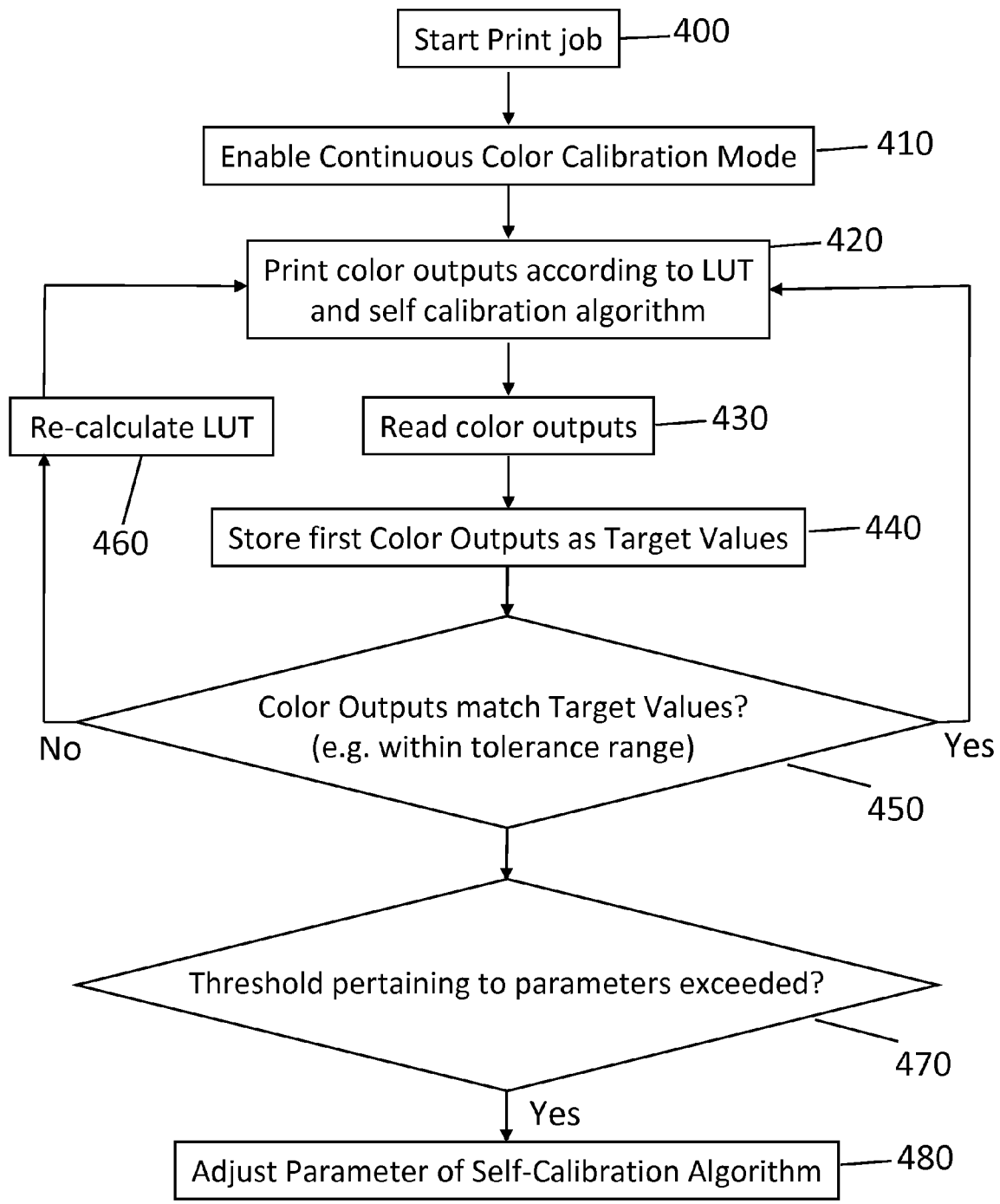
FIG. 4 shows a flow chart of another embodiment of a method of self-adjusting calibration parameters of a print system during color calibration.

FIG. 4 shows a flow chart of another embodiment of a method of self-adjusting calibration parameters of a print system during color calibration. In this embodiment, a method of continuous color calibration of a print system 1 is included. In a first block 400, a print job is started. A continuous color calibration mode is enabled in a next block 410. The continuous color calibration mode may be activated at any moment, for example before, after or at the same time as starting the print job.

In a further block 420 the color outputs 9 are printed on the sheets 5. The colors of the respective color outputs 9 may be determined by certain LUT settings. Other properties of the color outputs 9 may be determined by the calibration algorithm. For example, four solid patches 11 and/or fifteen gray patches 11 may be printed every two sheets 5.

In an embodiment, in the block 420, a machine LUT may be used if a continuous color calibration mode has not been activated. A dynamic LUT may be used if the continuous color calibration mode has been activated. A machine LUT may be used if the continuous color calibration mode has been activated, but the dynamic LUT has not been calculated yet, for example for a first print or a first series of prints after activation of the continuous color calibration mode.

In a further block 430 the color outputs 9 are read by the image sensor 6. In again a further block 440, first printed color outputs 9 are stored as target values. In one embodiment, a target collection step is initiated automatically after the Continuous Color Calibration is enabled, in this block 440, so that consequent print colors are based on the color outputs 9 that are stored as target values. The target values may be used as reference values for the color outputs, until they are reset during a new target collection.

In block 450, consequent printed color outputs 9 are compared with the target values. In one embodiment, the optical density of the color outputs 9 is compared with the optical density of the target values. In an embodiment, an optical density tolerance range of the color outputs 9 is applied for comparing the color outputs 9 with the target values, to allow for a certain margin. The optical density tolerance range may be one of the parameters of the calibration algorithm.

If the color outputs 9 do not match the respective target values, taking into account said tolerance range, the respective LUT is re-calculated by the processor 8, as indicated by a further block 460. For example, the dynamic LUT is re-calculated and subsequently used for printing new color outputs 9 (block 420).

The steps of blocks 420-460 may be continuously repeated and executed at the same time. The dynamic LUT is recalculated when colors of the color outputs 9 deviate from the target values, so that a relative color consistency is maintained. If the measured color outputs 9 match the target values, the LUT does not need to be re-calculated.

During the continuous color calibration, the calibration parameters may be continuously self-adjusted to optimize the color calibration. Therefore, in block 470 it is verified if a threshold pertaining to a calibration parameter is exceeded. This verification may be made parallel to the verification of block 450. If the threshold is exceeded, the respective parameter is adjusted, as indicated by a further block 480.

Figure 5:
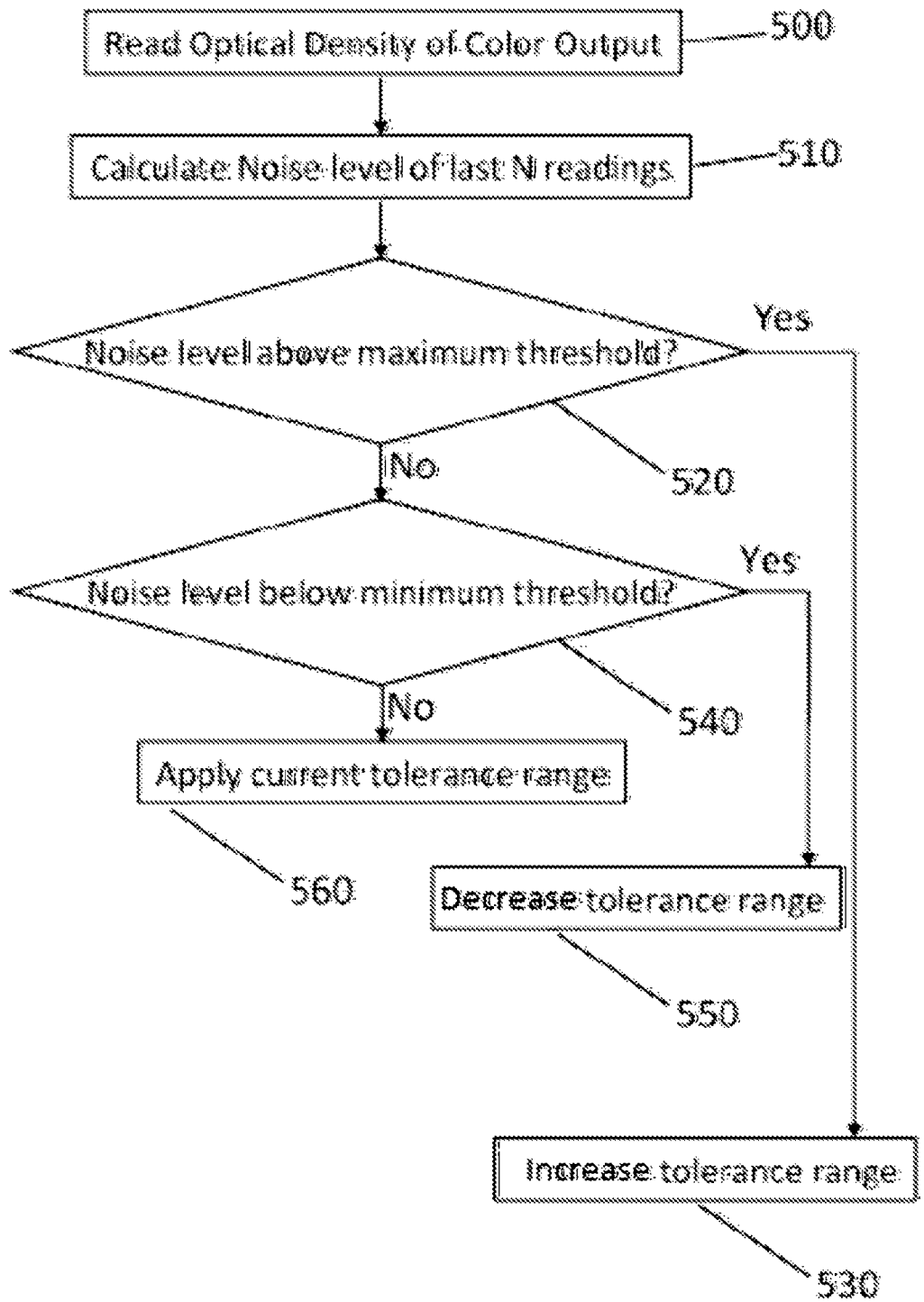
FIG. 5 shows a flow chart of an embodiment of adjusting an optical density tolerance range of a calibration algorithm.
Figure 6:
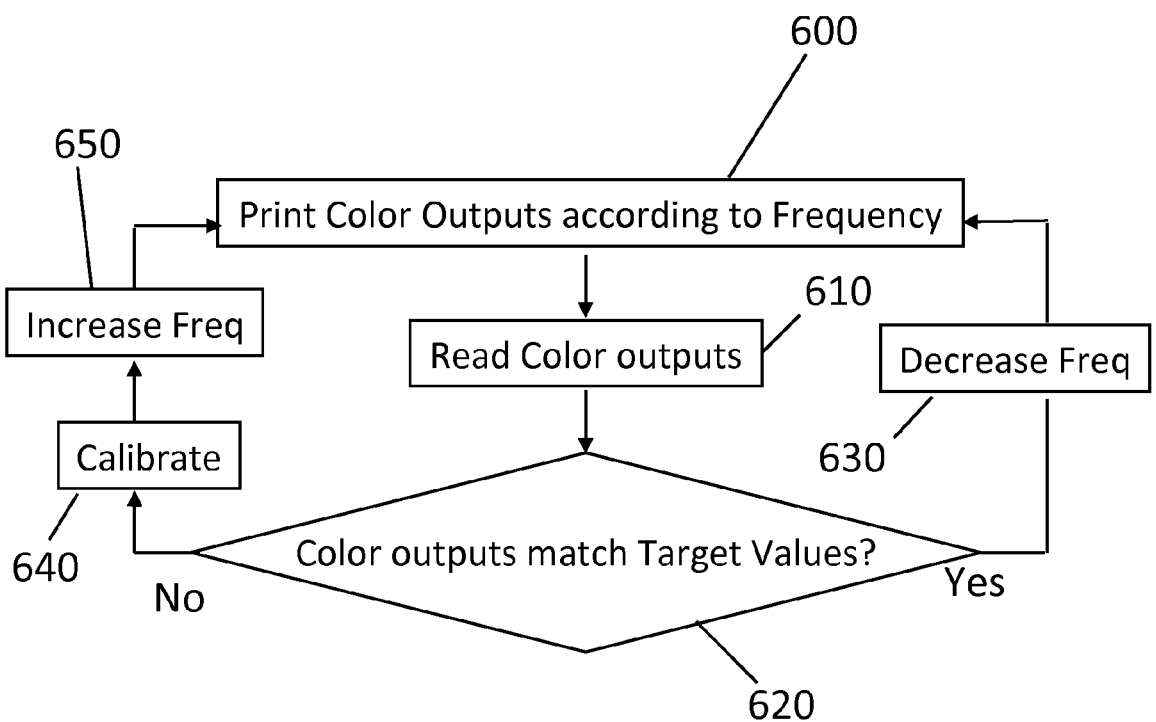
FIG. 6 shows a flow chart of an embodiment of adjusting a frequency of printing color outputs.

FIGS. 5 and 6 illustrate examples of adjusting a calibration parameter when a threshold pertaining to the calibration parameter is exceeded. In FIG. 5 an embodiment of a method of adjusting a calibration parameter is shown, wherein the parameter comprises a tolerance range of the optical density of the respective color output 9. This optical density tolerance range is used in color calibration, for comparing the optical density of the color output 9 with the optical density of the target value.

In a block 500, the optical density of a color output 9 is read by the image sensor 6. This may be for color calibration purposes, as explained with reference to block 450. In a next block 510, a noise level of a number N of last optical density readings is calculated. In an embodiment, the noise level is calculated by:

$$\text{noise level} = \frac{\text{Standard Deviation (last } N \text{ readings)}}{\text{Optical Density Tolerance Range}}.$$

In the embodiment, the noise level is determined by calculating a ratio between a standard deviation of a number N of last readings of the optical density and the current optical density tolerance range of the current calibration algorithm. Herein, a relatively high noise level indicates relatively unstable readings, and a relatively low noise level indicates relatively stable readings.

In a block 520, it is verified if the calculated noise level is above a maximum noise level threshold. If the noise level is above the maximum threshold, the optical density tolerance range may be increased, as indicated by a next block 530. Since the readings are relatively unstable, a wider tolerance range may be more suitable for the current operational state of the print system 1. The increased tolerance range may be applied when comparing the color outputs 9 with the target values, as indicated by block 450.

In another block 540, it is verified if the calculated noise level is below a minimum noise level threshold. If the noise level is below the minimum threshold, this may imply relatively stable optical density readings so that the optical density tolerance range may be decreased, as indicated by another block 550. Since a relatively precise reading is obtained in the current operational state of the print system 1, a narrower tolerance range may be applied for comparing the respective color outputs 9 with the corresponding target values, as indicated by block 450. The minimum and maximum noise level thresholds may be predetermined and stored in the storage arrangement 7.

If the noise level does not exceed the maximum or minimum threshold, the current tolerance range of the calibration algorithm may be maintained, as indicated by a next block 560. The steps of the blocks of the method of FIG. 5 may be performed simultaneously, parallel to continuous color calibration.

In FIG. 6 an embodiment of a method of adjusting a calibration parameter is shown, wherein the parameter comprises a frequency of printing the respective color outputs 9. In a first block 600, the color outputs 9 are printed according to a certain frequency. For example, at first the strip 10 of color calibration patches 11 is printed every two sheets 5 during printing. The color outputs 9 are read by the image sensor 6, as indicated by a second block 610. In a next block 620, it is verified if the color outputs 9 match the target values, in correspondence with block 450.

If a color output 9 matches its target values, this may imply that the corresponding color is relatively stable. Compliant with the continuous color calibration, the respective color output 9 may not need color calibration. In addition, the respective color output 9 may be printed with a lower frequency, as indicated by a further block 630. In an illustrative embodiment of said block 630, an optical density of a gray output 9 matches a respective target value, after which it is printed less than less stable other color outputs 9.

In an embodiment, a color output 9 does not match a corresponding target value. Correspondingly, a calibration of the respective color output 9 may be needed, as indicated by a further block 640. Furthermore, the frequency of printing the respective color output 9 may be increased, as indicated by a further block 650. A higher frequency may facilitate a higher frequency of the color calibration, which in turn may aid in a better color consistency.

In FIG. 6, the predetermined threshold comprises a number of color calibrations pertaining to the color output. If a number of calibrations pertaining to a particular color output 9 exceeds the predetermined threshold, its printing frequency may be adapted.

In an embodiment, a threshold of the embodiment of FIG. 6 is one calibration each four sheets 5. For example, if one calibration is performed for that color output 9, the printing frequency of the respective color output 9 may be increased to one print for each three or two sheet 5.

As a result of the self adjustment of the color output frequency, the color calibration strips 10 may vary dynamically for each sheet 5 during printing. The embodiments of FIGS. 5 and 6 may be applied in a combined manner or separately. For each color output 9, different frequencies and/or different optical density tolerance ranges may be applied.

The disclosed methods and systems may allow for automated optimization of the calibration algorithm. By automated optimization of the calibration algorithm, an operator or an engineer does not need to manually change the parameters. A continuous color calibration may run automatically and optimally. The calibration algorithm is able to adapt itself to the operational state of the print system 1.

In an embodiment, software may be installed on a print system 1 for enabling self adjusting of the calibration algorithm. For example, a computer program product 20 for adjusting a calibration algorithm of a color calibration is provided. The computer program product may comprise instructions for instructing a processor 8 to (i) execute printing of color outputs 9 on print sheets 5 for color calibration, (ii) read the color outputs 9, (iii) compare the readings to predetermined thresholds pertaining to respective parameters of the calibration algorithm, and (iv) adjust the calibration parameter if the threshold is exceeded.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. The indefinite article "a" or "an" does not exclude a plurality, while a reference to a certain number of elements does not exclude the possibility of having more or less elements. A single unit may fulfill the functions of several items recited in the disclosure, and vice versa several items may fulfill the function of one unit.

In the following claims, the mere fact that certain measures are recited in mutually different dependent claims does not indicate that a combination of these measures cannot be used to advantage. Multiple alternatives, equivalents, variations and combinations may be made without departing from the scope of the invention.

The invention claimed is:

1. A method of self-adjusting calibration parameters of a print system during color calibration, the method performed by one or more processors of the print system and comprising:
   printing a number of respective color outputs on one or more sheets for color calibration;
   measuring an optical density noise level for each of the respective color outputs based on a calibration algorithm, the calibration algorithm including an optical density tolerance range for each respective color output;
   for each respective color output, determining when the optical density noise level exceeds one or more thresholds;
   based on determining that the optical density noise level exceeds a maximum threshold, increasing the optical density tolerance range for the respective color output; and
   based on determining that the optical density noise level is below a minimum threshold, decreasing the optical density tolerance range for the respective color output.

2. The method of claim 1, wherein the respective color outputs comprise color calibration patches.

3. The method of claim 1, further comprising:
   based on determining that the optical density noise level does not exceed the one or more thresholds, maintaining the optical density tolerance range for the respective color output.

4. The method of claim 1, further comprising:
   printing the respective color outputs near an edge of the one or more sheets.

5. The method of claim 1, wherein measuring the optical density noise level for each of the respective color outputs is performed by an image sensor of the print system.

6. The method of claim 5, wherein the maximum threshold corresponds to a relatively unstable optical density reading by the image sensor, and wherein the minimum threshold corresponds to a relatively stable optical density reading by the image sensor.

7. The method of claim 1, wherein the optical density noise level comprises a ratio between a standard deviation of a number of optical density measurements for the respective color output versus the optical density tolerance range for the respective color output.

8. The method of claim 1, wherein the print system is to adjust a frequency of printing one or more of the respective color outputs based on determining when the optical density noise level exceeds one of the one or more thresholds.

9. The method of claim 1, wherein the print system is to perform the method of self-adjusting the calibration parameters continuously, and wherein printing the number of respective color outputs is performed using a dynamic LUT, the method further comprising:
storing a respective target value for each of the respective color outputs;
comparing each subsequently printed color output, corresponding to the number of respective color outputs, with the respective target value; and
recalibrating the dynamic LUT when the subsequently printed color output does not match the respective target value.

10. A print system comprising:
an image transfer arrangement;
an image sensor;
one or more processors; and
one or more memory resources storing instructions for self-adjusting calibration parameters of the print system during color calibration, wherein the instructions, when executed by the one or more processors, cause the print system to perform operations comprising:
using the image transfer arrangement, printing a number of respective color outputs on one or more sheets for color calibration;
using the image sensor, measuring each of the respective color outputs on the one or more sheets based on
a calibration algorithm comprising a number of calibration parameters to set conditions for the color calibration, the calibration parameters including a frequency of printing the respective color output, wherein the calibration algorithm further comprises a number of thresholds pertaining to the calibration parameters; and
adjusting the frequency of printing the respective color output when at least one of the thresholds pertaining to the calibration parameters is exceeded.

11. The print system of claim 10, wherein the print system is to perform self-adjustment of the calibration parameters continuously, wherein printing the number of respective color outputs is performed using a dynamic LUT, and wherein the instructions, when executed by the one or more processors, cause the print system to perform further operations comprising:
storing a respective target value for each of the respective color outputs;
comparing each subsequently printed color output, corresponding to the number of respective color outputs, with the respective target value; and
recalibrating the dynamic LUT when the subsequently printed color output does not match the respective target value.

12. The print system of claim 10, wherein the calibration parameters further include
an optical density tolerance range for each of the respective color outputs.

13. The print system of claim 12, wherein the number of thresholds pertaining to the calibration parameters includes at least one of
an optical density noise level of a number of previous color output measurements, and
a number of calibrations pertaining to the respective color output.

14. The print system of claim 10, wherein the respective color outputs comprise color calibration patches printed near an edge of the one or more sheets.

15. A non-transitory computer readable medium storing instructions for self-adjusting calibration parameters of a print system during color calibration, wherein the instructions, when executed by a processor of the print system, cause the print system to:
print a number of respective color outputs on one or more sheets for color calibration;
measure an optical density noise level for each of the respective color outputs based on a calibration algorithm, the calibration algorithm including an optical density tolerance range for each respective color output;
for each respective color output, determine whether the optical density noise level exceeds one or more thresholds;
based on determining that the optical density noise level exceeds a maximum threshold, increase the optical density tolerance range for the respective color output; and
based on determining that the optical density noise level is below a minimum threshold, decrease the optical density tolerance range for the respective color output.

* * * * *